(12) United States Patent
Matsushita et al.

(10) Patent No.: US 11,705,278 B2
(45) Date of Patent: Jul. 18, 2023

(54) MULTI-LAYER CERAMIC ELECTRONIC COMPONENT, CIRCUIT BOARD, AND METHOD OF PRODUCING A MULTI-LAYER CERAMIC ELECTRONIC COMPONENT

(71) Applicant: TAIYO YUDEN CO., LTD., Tokyo (JP)

(72) Inventors: Kunihiro Matsushita, Takasaki (JP); Takashi Sasaki, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 17/235,791

(22) Filed: Apr. 20, 2021

(65) Prior Publication Data

US 2021/0335542 A1    Oct. 28, 2021

(30) Foreign Application Priority Data

Apr. 24, 2020  (JP) .................. 2020-077031

(51) Int. Cl.
*H01G 4/012* (2006.01)
*H01G 4/30* (2006.01)
*H01G 2/06* (2006.01)
*H01G 4/008* (2006.01)
*H01G 4/12* (2006.01)

(52) U.S. Cl.
CPC ............ *H01G 4/012* (2013.01); *H01G 2/065* (2013.01); *H01G 4/008* (2013.01); *H01G 4/1218* (2013.01); *H01G 4/30* (2013.01)

(58) Field of Classification Search
CPC ...... H01G 2/065; H01G 4/008; H01G 4/1218; H01G 4/30; H01G 4/228; H01G 4/38; H01G 4/012

USPC .... 361/306.3, 321.3, 321.1, 301.4, 328, 303
See application file for complete search history.

(56) References Cited

U.S. PATENT DOCUMENTS

| | | | | |
|---|---|---|---|---|
| 2014/0138138 A1* | 5/2014 | Park | ............... | H01G 2/06 174/260 |
| 2014/0311789 A1* | 10/2014 | Han | ............... | H01G 4/12 361/301.4 |
| 2016/0351332 A1* | 12/2016 | Lee | ............... | H01G 4/232 |
| 2016/0381802 A1* | 12/2016 | Taniguchi | ............ | H01G 4/008 174/260 |
| 2017/0352481 A1* | 12/2017 | Park | ............... | H01G 4/30 |
| 2018/0082793 A1* | 3/2018 | Satoh | ............. | H01G 4/2325 |
| 2018/0182550 A1* | 6/2018 | Sasaki | ............ | H01G 4/232 |
| 2019/0066923 A1* | 2/2019 | Jung | ............. | H01G 4/008 |

(Continued)

FOREIGN PATENT DOCUMENTS

JP    2014197572 A    10/2014

*Primary Examiner* — Arun Ramaswamy
(74) *Attorney, Agent, or Firm* — Law Office of Katsuhiro Arai

(57) ABSTRACT

A multi-layer ceramic electronic component includes a ceramic body and an external electrode. The ceramic body includes an end surface facing in a first direction, and internal electrodes exposed from the end surface and laminated in a second direction orthogonal to the first direction. The external electrode is provided on the end surface and includes two protrusions that are formed along two peripheral portions of the end surface and protrude in the first direction, the two peripheral portions being disposed in a third direction orthogonal to the first direction and the second direction.

9 Claims, 12 Drawing Sheets

(56) References Cited

U.S. PATENT DOCUMENTS

| | | | |
|---|---|---|---|
| 2019/0131073 A1* | 5/2019 | Onodera | H01G 4/30 |
| 2020/0176190 A1* | 6/2020 | Park | H01G 4/38 |
| 2020/0234887 A1* | 7/2020 | Muramatsu | H01G 4/012 |
| 2020/0312562 A1* | 10/2020 | Nishibayashi | H01G 4/2325 |

* cited by examiner

MULTI-LAYER CERAMIC ELECTRONIC COMPONENT, CIRCUIT BOARD, AND METHOD OF PRODUCING A MULTI-LAYER CERAMIC ELECTRONIC COMPONENT

BACKGROUND ART

The present disclosure relates to a multi-layer ceramic electronic component, a circuit board mounting the multi-layer ceramic electronic component, and a method of producing a multi-layer ceramic electronic component.

A multi-layer ceramic electronic component such as a multi-layer ceramic capacitor is electrically connected to an electrode pad of a printed board via a solder as described in, for example, Japanese Patent Application Laid-open No. 2014-197572 (paragraphs [0101] and [0102], and FIGS. 4 and 5). The solder bonds the surface of an external electrode of the multi-layer ceramic electronic component and the electrode pad to each other.

SUMMARY OF THE INVENTION

In recent years, the multi-layer ceramic electronic components have been densely mounted on a board in some cases. If the mounting density increases, the solders formed on the external electrodes of the adjacent multi-layer ceramic electronic components may be fused, and a defect such as a short circuit may be caused.

In view of the circumstances as described above, it is desirable to provide a multi-layer ceramic electronic component capable of being mounted densely without causing defects, a circuit board mounting the multi-layer ceramic electronic components densely, and a method of producing a multi-layer ceramic electronic component.

Additional or separate features and advantages of the disclosure will be set forth in the descriptions that follow and in part will be apparent from the description, or may be learned by practice of the disclosure. The objectives and other advantages of the disclosure will be realized and attained by the structure particularly pointed out in the written description and claims thereof as well as the appended drawings.

To achieve these and other advantages and in accordance with the purpose of the present disclosure, as embodied and broadly described, in one embodiment, the present disclosure provides a multi-layer ceramic electronic component including a ceramic body and an external electrode.

The ceramic body includes an end surface facing in a first direction, and internal electrodes exposed from the end surface and laminated in a second direction orthogonal to the first direction.

The external electrode is provided on the end surface and includes two protrusions that are formed along two peripheral portions of the end surface and protrude in the first direction, the two peripheral portions being disposed in a third direction orthogonal to the first direction and the second direction.

The multi-layer ceramic electronic component is mounted on a board when the external electrode is soldered onto the board. In the configuration described above, the external electrode includes protrusions along two peripheral portions disposed in the third direction, and thus the surface area of the external electrode is increased as compared to a configuration in which the center portion has a convex shape. Since the solder spreads out along the surface of the external electrode, if the solder spreads over the surfaces of the two protrusions, the thickness of the solder can be reduced as compared to the configuration in which the center portion has the convex shape. Therefore, even when the external electrodes of a plurality of multi-layer ceramic electronic components disposed close to one another in the first direction are soldered, the thickness of the solder on the external electrodes thereof can be restricted, and the solders can be prevented from being fused. This allows high-density mounting without causing defects.

For example, a dimension of each of the two protrusions in the third direction may be 15 μm or more and 60 μm or less.

For example, a dimension of each of the two protrusions in the first direction may be 10 μm or more and 20 μm or less.

For example, each of the two protrusions may include a top portion most protruding in the first direction on a cross-section viewed in the second direction, and a distance in the third direction between the top portions of the two protrusions may be 250 μm or more and 285 μm or less.

In another embodiment, the present disclosure provides a circuit board including a mount board having a mount surface, two multi-layer ceramic electronic components, and a solder.

The two multi-layer ceramic electronic components are disposed side by side in a first direction and each include a ceramic body and an external electrode. The ceramic body includes an end surface facing in the first direction, and internal electrodes exposed from the end surface and laminated in a second direction orthogonal to the first direction. The external electrode is provided on the end surface and connected to the mount surface.

The solder bonds a surface of the external electrode and the mount surface to each other.

The external electrode includes a protrusion that is formed along a peripheral portion of the end surface and protrudes in the first direction.

A distance in the first direction between the external electrodes of the two multi-layer ceramic electronic components is 100 μm or less.

In the configuration described above, the external electrode includes a protrusion along a peripheral portion, and thus the surface area of the external electrode is increased as compared to a configuration in which the center portion has a convex shape. Since the solder spreads out the surface of the external electrode, if the solder spreads over the surface of the protrusion, the thickness of the solder can be reduced as compared to the configuration in which the center portion has the convex shape. Therefore, even when the external electrodes of the two multi-layer ceramic electronic components are soldered with each other with a distance of 100 μm or less in the first direction, the thickness of the solder on both of the external electrodes can be restricted, and the solders can be prevented from being bonded. This allows high-density mounting.

For example, the external electrode may include two protrusions that are formed along two peripheral portions of the end surface and protrude in the first direction, the two peripheral portions being disposed in a third direction orthogonal to the first direction and the second direction.

In still another embodiment, the present disclosure provides a method of producing a multi-layer ceramic electronic component, the method including: preparing a ceramic body including an end surface facing in a first direction, and internal electrodes exposed from the end surface and laminated in a second direction orthogonal to the first direction; and forming an external electrode on the end surface, the external electrode including two protrusions that are formed along two peripheral portions of the end surface and protrude in the first direction, the two peripheral portions being disposed in a third direction orthogonal to the first direction and the second direction.

Additionally, the end surface may include a recess and two protrusions, the recess being formed at the center portion in the third direction, the two protrusions being disposed outside the recess in the third direction and protruding in the first direction.

The two protrusions of the external electrode may be formed on the two protrusions of the end surface.

As described above, according to the present disclosure, it is possible to provide a multi-layer ceramic electronic component capable of being mounted densely without causing defects, a circuit board mounting the multi-layer ceramic electronic components densely, and a method of producing a multi-layer ceramic electronic component.

These and other objects, features and advantages of the present disclosure will become more apparent in light of the following detailed description of embodiments thereof, as illustrated in the accompanying drawings.

It is to be understood that both the foregoing general description and the following detailed description are exemplary and explanatory, and are intended to provide further explanation of the disclosure as claimed.

DETAILED DESCRIPTION OF THE EMBODIMENTS

Hereinafter, embodiments of the present disclosure will be described with reference to the drawings.

In the figures, an X axis, a Y axis, and a Z axis orthogonal to one another are shown as appropriate. The X axis, the Y axis, and the Z axis are common in all figures.

1. Configuration of Multi-Layer Ceramic Capacitor 10

Figure 1:
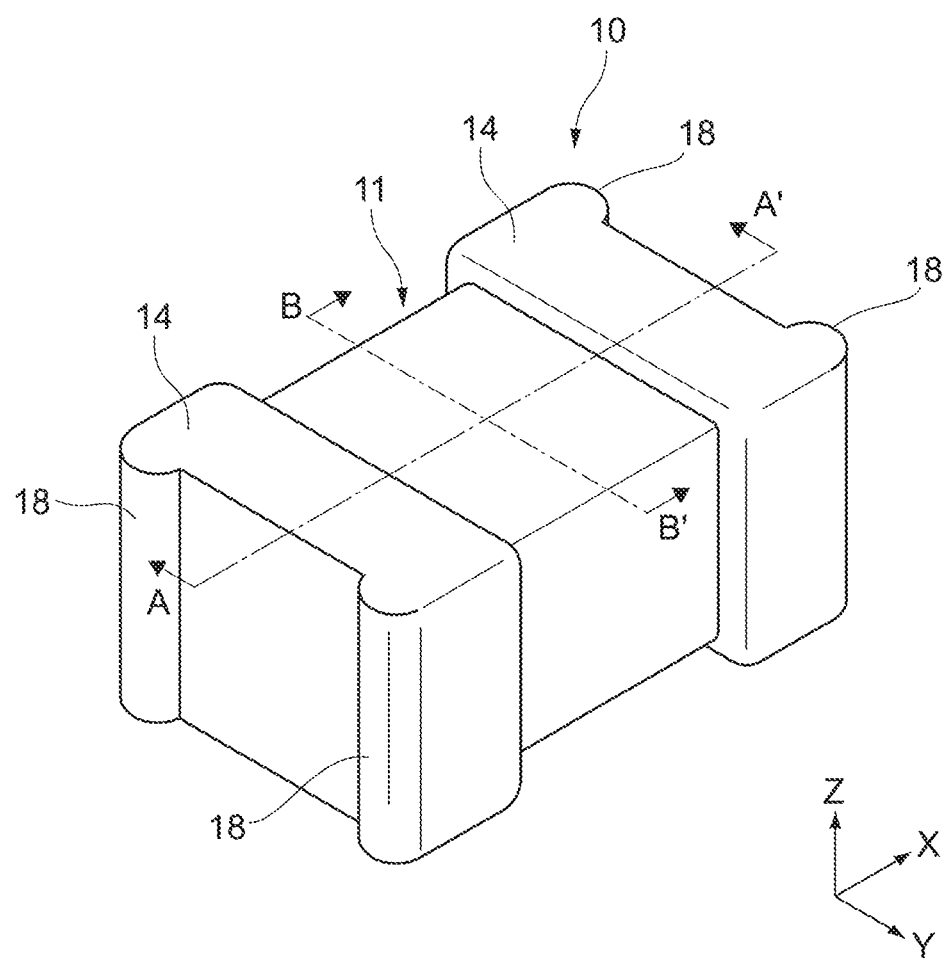
FIG. 1 is a perspective view of a multi-layer ceramic capacitor according to an embodiment of the present disclosure.
Figure 2:
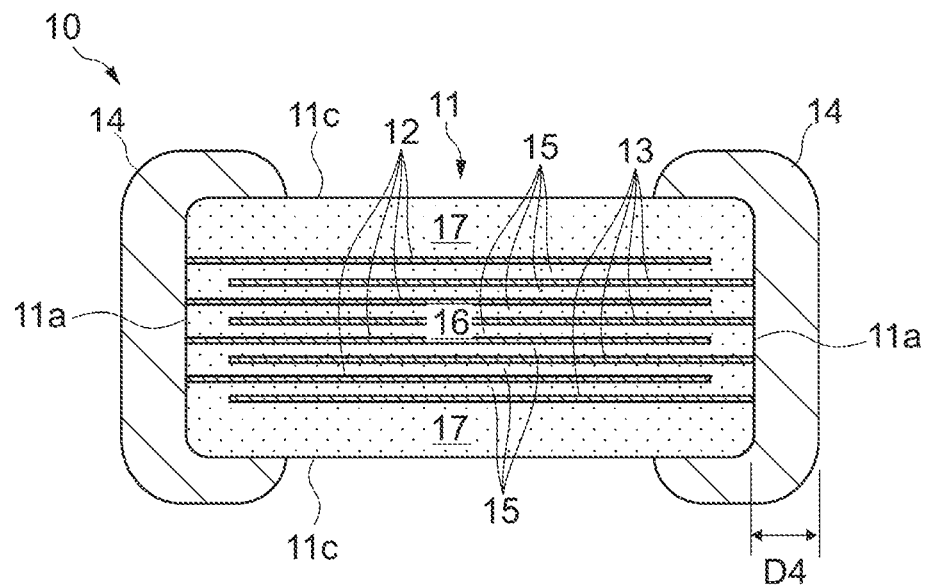
FIG. 2 is a cross-sectional view of the multi-layer ceramic capacitor taken along the A-A' line in FIG. 1.
Figure 3:
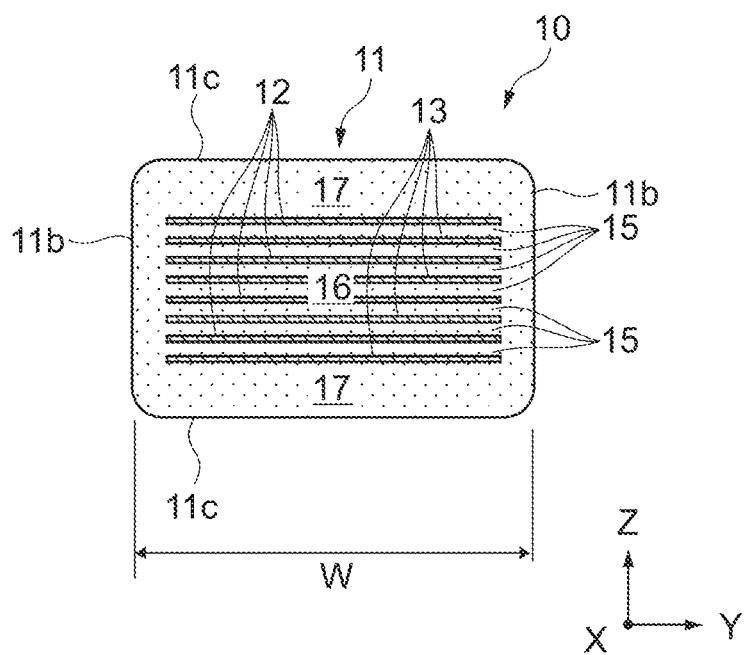
FIG. 3 is a cross-sectional view of the multi-layer ceramic capacitor taken along the B-B' line in FIG. 1.

FIGS. 1 to 3 each show a multi-layer ceramic capacitor 10 according to an embodiment of the present disclosure. FIG. 1 is a perspective view of the multi-layer ceramic capacitor 10. FIG. 2 is a cross-sectional view of the multi-layer ceramic capacitor 10 taken along the A-A' line in FIG. 1. FIG. 3 is a cross-sectional view of the multi-layer ceramic capacitor 10 taken along the B-B' line in FIG. 1.

The multi-layer ceramic capacitor 10 includes a ceramic body 11 and external electrodes 14.

The ceramic body 11 has two end surfaces 11a facing each other in the X-axis direction, two side surfaces 11b facing each other in the Y-axis direction, and two main surfaces 11c facing each other in the Z-axis direction. The external electrodes 14 are provided on the end surfaces 11a. Ridges that connect the surfaces of the ceramic body 11 may be chamfered. Each surface of the ceramic body 11 is not limited to a flat surface and may be a curved surface or a surface having fine irregularities thereon. For example, the end surface 11a may have a shape in which peripheral portions thereof in the Y-axis direction protrude in the X-axis direction, as will be described later.

The ceramic body 11 includes a capacitance forming unit 16 and a protective portion 17. The capacitance forming unit 16 includes a plurality of first internal electrodes 12 and a plurality of second internal electrodes 13 and has a configuration in which those first and second internal electrodes 12 and 13 are alternately laminated in the Z-axis direction via a plurality of ceramic layers 15. The protective portion 17 covers the surfaces of the capacitance forming unit 16, which are close to the main surfaces 11c facing each other in the Z-axis direction, and the surfaces of the capacitance forming unit 16, which are close to the side surfaces 11b facing each other in the Y-axis direction.

The first internal electrodes 12 are drawn to one of the end surfaces 11a and spaced apart from the other end surface 11a. The second internal electrodes 13 are spaced apart from the end surface 11a to which the first internal electrodes 12 are drawn, and are drawn to the other end surface 11a.

Typically, the first and second internal electrodes 12 and 13 mainly contain nickel (Ni) and function as internal electrodes of the multi-layer ceramic capacitor 10. Note that the first and second internal electrodes 12 and 13 may mainly contain copper (Cu), silver (Ag), palladium (Pd), platinum (Pt), or the like, other than nickel (Ni).

The ceramic layers 15 are formed from dielectric ceramics. In order to increase the capacitance of the capacitance forming unit 16, the ceramic layers 15 are formed from dielectric ceramics having a high dielectric constant.

Examples of the dielectric ceramics having a high dielectric constant to be used include a polycrystal including a barium titanate ($BaTiO_3$) based material, i.e., a polycrystal having a Perovskite structure containing barium (Ba) and titanium (Ti). Thus, the multi-layer ceramic capacitor 10 having a large capacity is obtained.

Note that the ceramic layers 15 may be formed from a strontium titanate ($SrTiO_3$) based material, a calcium titanate ($CaTiO_3$) based material, a magnesium titanate ($MgTiO_3$) based material, a calcium zirconate ($CaZrO_3$) based material, a calcium zirconate titanate ($Ca(Zr,Ti)O_3$) based material, a barium zirconate ($BaZrO_3$) based material, a titanium oxide ($TiO_2$) based material, or the like.

The protective portion 17 is also formed from dielectric ceramics. The material forming the protective portion 17 only needs to be insulating ceramics, but if dielectric ceramics similar to that of the ceramic layers 15 is used therefor, the internal stress in the ceramic body 11 is reduced.

The protective portion 17 covers the surfaces of the capacitance forming unit 16 except the end surfaces 11a. The protective portion 17 has main functions of protecting the periphery of the capacitance forming unit 16 and ensuring insulation properties of the first and second internal electrodes 12 and 13. Hereinafter, the regions close to the main surfaces 11c in the protective portion 17 are referred to as cover regions, and the regions close to the side surfaces 11b in the protective portion 17 are referred to as side margin regions.

The external electrodes 14 are provided on the end surfaces 11a and extend to the main surfaces 11c and the side surfaces 11b. One of the external electrodes 14 is connected to the first internal electrodes 12 on one of the end surfaces 11a, and the other external electrode 14 is connected to the second internal electrodes 13 on the other end surface 11a.

Hereinafter, a detailed configuration of the external electrode 14 will be described.

2. Detailed Configuration of External Electrode 14

Figure 4:
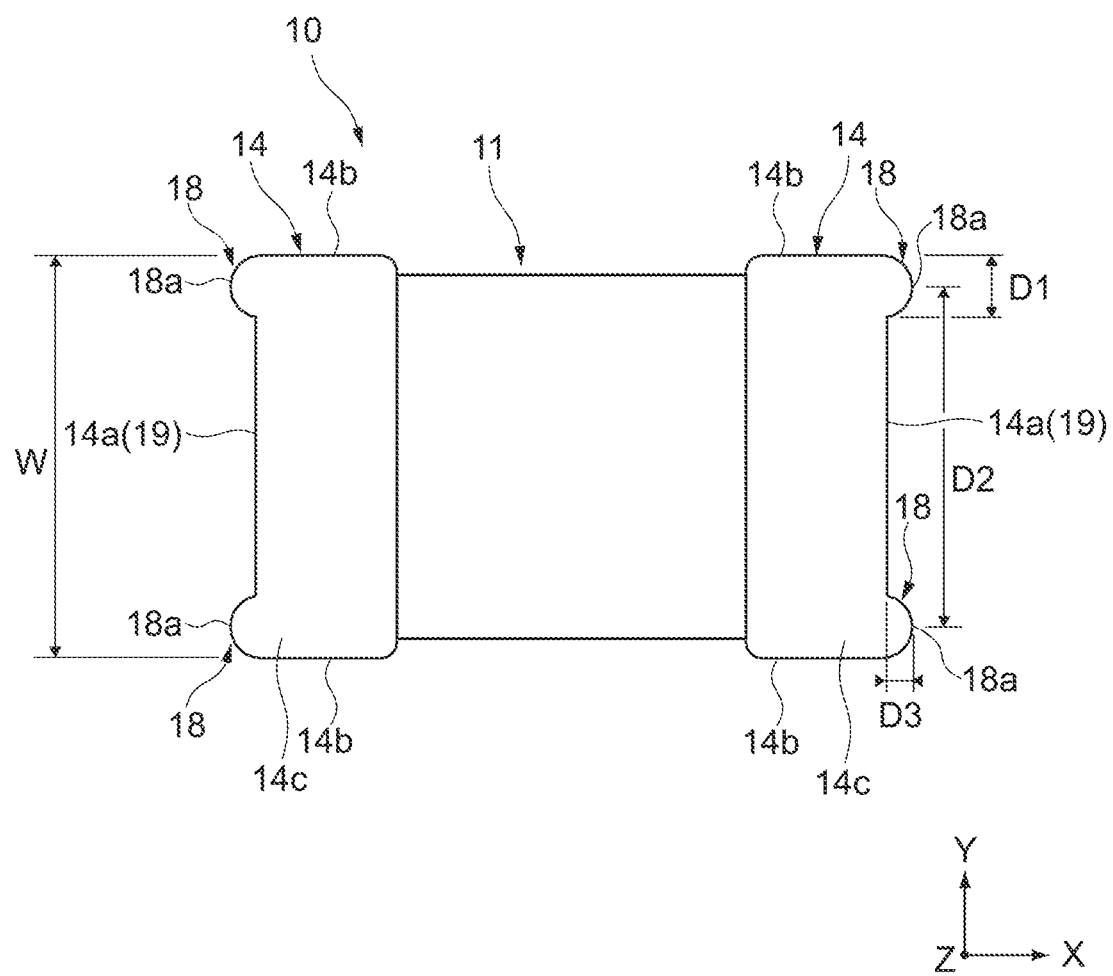
FIG. 4 is a plan view of the multi-layer ceramic capacitor.

FIG. 4 is a plan view of the multi-layer ceramic capacitor 10 when viewed in the Z-axis direction.

As shown in FIGS. 1 and 4, each of the external electrodes 14 has a first surface 14a facing in the X-axis direction, second surfaces 14b facing each other in the Y-axis direction, and third surfaces 14c facing each other in the Z-axis direction. The first surface 14a is formed on the end surface 11a. The second surfaces 14b are formed on the side surfaces 11b in this embodiment. The third surfaces 14c are formed on the main surfaces 11c in this embodiment.

As shown in FIGS. 1 and 4, the external electrode 14 includes two protrusions 18 that are formed along two peripheral portions of the end surface 11a disposed in the Y-axis direction and protrude in the X-axis direction. The peripheral portions of the end surface 11a that are disposed in the Y-axis direction are portions at peripheral edges of the end surface 11a in the Y-axis direction and extending in the Z-axis direction along the outer edges of the end surface 11a. The two protrusions 18 are also configured to extend in the Z-axis direction on the first surface 14a.

Each of the protrusions 18 includes a top portion 18a that protrudes most in the X-axis direction on the cross-section obtained when viewed in the Z-axis direction. Each top portion 18a is also configured to extend in the Z-axis direction. The shape of the top portion 18a is not particularly limited. For example, the top portion 18a may have a convexly curved shape or may sharply protrude. Additionally, the position of the top portion 18a is not limited to the center of the protrusion 18 in the Y-axis direction and may be displaced in the Y-axis direction.

In this embodiment, the external electrode 14 further includes a central portion 19 disposed between the two protrusions 18, which are apart from each other in the Y-axis direction on the first surface 14a. The central portion 19 has a substantially flat configuration in this embodiment, but may include fine irregularities whose protruding amount in the X-axis direction is 1 µm or less, for example.

The external electrode 14 includes the two protrusions 18 apart from each other in the Y-axis direction, and thus the surface area of the external electrode 14 can be increased. This makes it possible to reduce the thickness of a solder that covers the surface of the external electrode 14 at the mounting on a mount board, as will be described later.

A width dimension D1 of each protrusion 18 in the Y-axis direction can be set to, for example, 15 µm or more. This makes it possible to satisfactorily ensure the width dimension D1 of each protrusion 18 and to satisfactorily ensure the surface area of the protrusion 18. The width dimension D1 of each protrusion 18 is assumed to be a dimension of the largest portion of each protrusion 18 in the Y-axis direction.

A ratio D1/W of the width dimension D1 to a width dimension W of the multi-layer ceramic capacitor 10 can be set to, for example, 0.02 or more. The width dimension W of the multi-layer ceramic capacitor 10 is assumed to be a dimension of the largest portion of the multi-layer ceramic capacitor 10 in the Y-axis direction.

Additionally, the width dimension D1 can be set to, for example, 60 µm or less. The ratio D1/W of the width dimension D1 to the width dimension W of the multi-layer ceramic capacitor 10 can be set to, for example, 0.20 or less.

Additionally, a distance D2 in the Y-axis direction between the top portions 18a of the two protrusions 18 can be set to, for example, 250 µm or more. This makes it possible to satisfactorily separate the top portions 18a of the protrusions 18 from each other in the Y-axis direction and to suppress the solder from being locally concentrated. The distance D2 is assumed to be a distance of a portion between the top portions 18a of the two protrusions 18 most apart from each other in the Y-axis direction.

A ratio D2/W of the distance D2 to the width dimension W of the multi-layer ceramic capacitor 10 can be set to, for example, 0.30 or more. Additionally, the distance D2 can be set to, for example, 285 µm or less. The ratio D2/W of the distance D2 to the width dimension W of the multi-layer ceramic capacitor 10 can be set to, for example, 0.95 or less.

A height dimension D3 of the top portion 18a in the X-axis direction can be set to, for example, 10 µm or more. This makes it possible to cause the protrusion 18 to satisfactorily protrude and to satisfactorily ensure the surface area of the protrusion 18. The height dimension D3 of the top portion 18a is assumed to be a height dimension in the X-axis direction from the thinnest portion of the central portion 19 in the X-axis direction to the top portion 18a.

A ratio D3/D4 of the height dimension D3 to a thickness dimension D4 of the central portion 19 can be set to, for example, 0.25 or more. The thickness dimension D4 of the central portion 19 is assumed to be a thickness dimension of the thinnest portion of the central portion 19 in the X-axis direction with reference to FIG. 2.

Additionally, the height dimension D3 can be set to, for example, 20 µm or less. The ratio D3/D4 of the height dimension D3 to the thickness dimension D4 of the central portion 19 can be set to, for example, 0.50 or less.

The external electrodes 14 thus configured are connected to a mount board by a solder, and thus a circuit board including the multi-layer ceramic capacitor 10 is configured.

3. Configuration of Circuit Board 100

Figure 5:
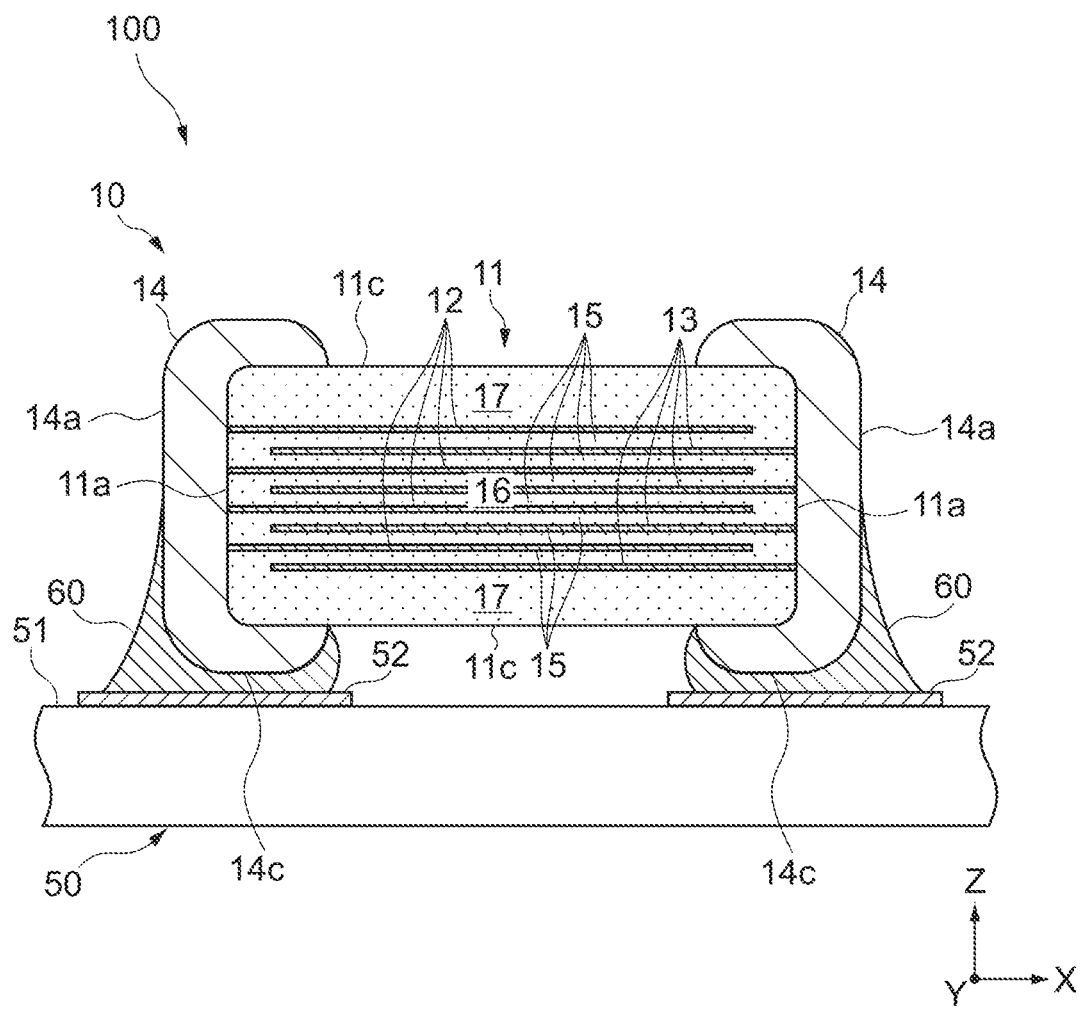
FIG. 5 is a cross-sectional view of a circuit board on which the multi-layer ceramic capacitor is disposed.
Figure 6:
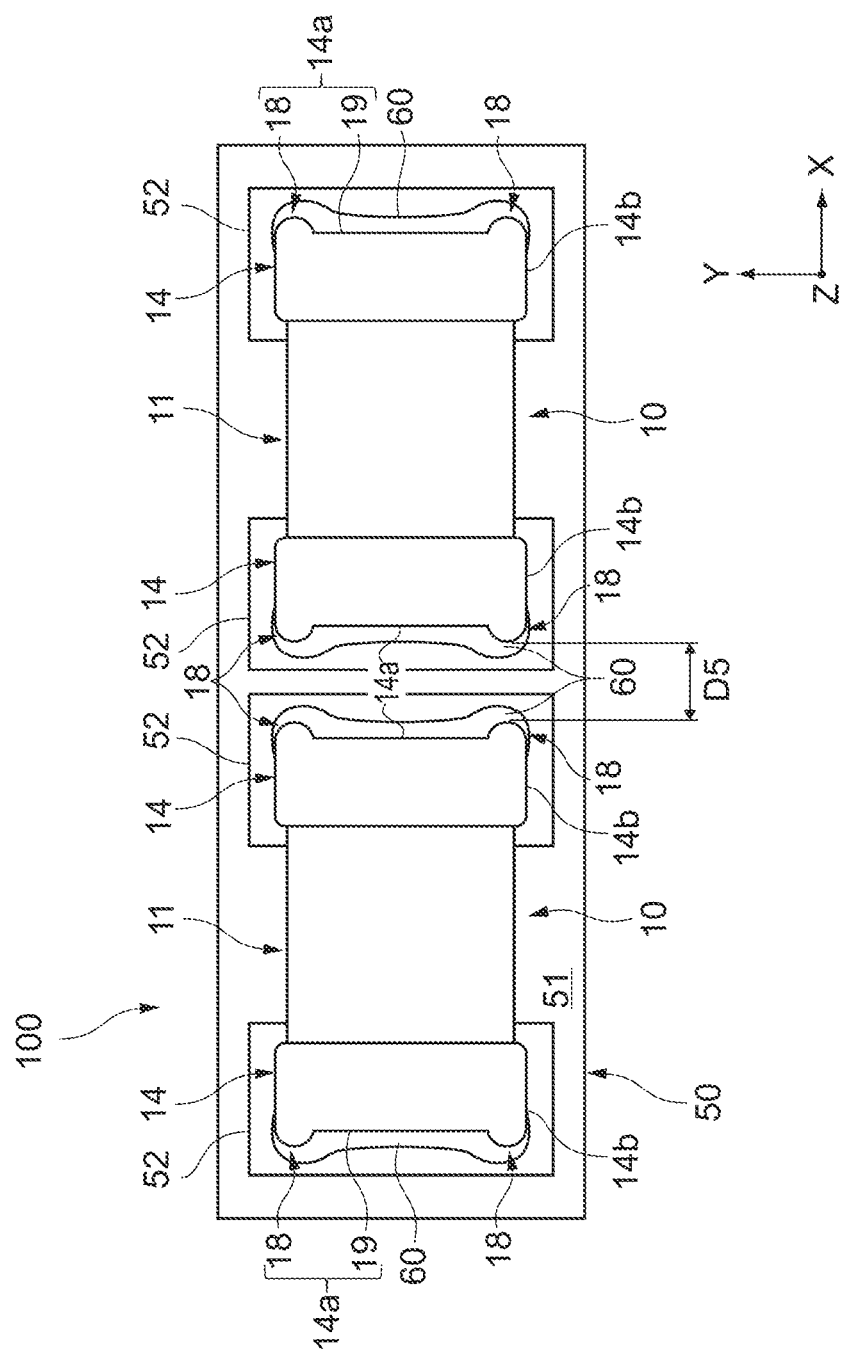
FIG. 6 is a plan view of the circuit board.

FIGS. 5 and 6 are views of a circuit board 100 according to this embodiment. FIG. 5 is a cross-sectional view of the circuit board 100 at a position corresponding to FIG. 2. FIG. 6 is a plan view of the circuit board 100 when viewed in the Z-axis direction.

The circuit board 100 includes a mount board 50 having a mount surface 51, at least two multi-layer ceramic capacitors 10, and a solder 60. Note that FIG. 5 is a cross-sectional view of a part of the circuit board 100, in which one multi-layer ceramic capacitor 10 is mounted. FIG. 6 shows a form in which the two multi-layer ceramic capacitors 10 are arranged. The circuit board 100 may include three or more multi-layer ceramic capacitors 10.

The mount surface 51 includes lands 52 connected to the external electrodes 14. The lands 52 are pad-like metal terminals disposed on the mount surface 51 and are each formed in a rectangular shape, for example. The lands 52 are provided to the respective external electrodes 14, for example. The portion of the mount surface 51 except the lands 52 is covered with, for example, an insulating solder resist, though not shown in the figure.

The multi-layer ceramic capacitor 10 is disposed on the mount surface 51 with one of the main surfaces 11*c* facing the mount surface 51, for example. As shown in FIG. 6, the two multi-layer ceramic capacitors 10 are disposed side by side in the X-axis direction. A distance D5 in the X-axis direction between the external electrodes 14 of the two multi-layer ceramic capacitors 10 is, for example, 100 μm or less, more favorably 80 μm or less. Note that the distance D5 is assumed to be a distance of the narrowest portion between the external electrodes 14 of the two adjacent multi-layer ceramic capacitors 10 in the X-axis direction.

The solder 60 bonds the surface of the external electrode 14 and the mount surface 51 to each other. The solder 60 is disposed between the land 52 and the third surface 14*c* of the external electrode 14 and is also formed to extend to the second surfaces 14*b* and the first surface 14*a* including the protrusions 18 of the external electrode 14.

The circuit board 100 is produced as follows. First, a solder paste is applied to the land 52 of the mount board 50, and the multi-layer ceramic capacitor 10 is disposed on the solder paste. The multi-layer ceramic capacitor 10 in this state is heated in a reflow furnace, and the solder paste is heated and melted. Along with the melt of the solder paste, the multi-layer ceramic capacitor 10 sinks down toward the land 52. Thus, the solder paste spreads upwardly from the third surface 14*c* to the first surface 14*a* and the second surfaces 14*b* of the external electrode 14. Subsequently, the solder paste is cooled and solidified to form the solder 60 that connects the external electrode 14 and the mount board 50 to each other, thus producing the circuit board 100 shown in FIGS. 5 and 6.

Here, when reaching the first surface 14*a*, the molten solder paste flows from a less undulating portion in the X-axis direction to a convex portion. In other words, the solder paste splits from the central portion 19 toward the two protrusions 18 to cover the protrusions 18. This makes it possible to suppress the solder paste from being locally concentrated in the multi-layer ceramic capacitor 10. In addition, the two protrusions 18 make it possible to increase the surface area of the external electrode 14. Thus, the thickness of the solder 60 on the first surface 14*a* can be suppressed.

Figure 7:
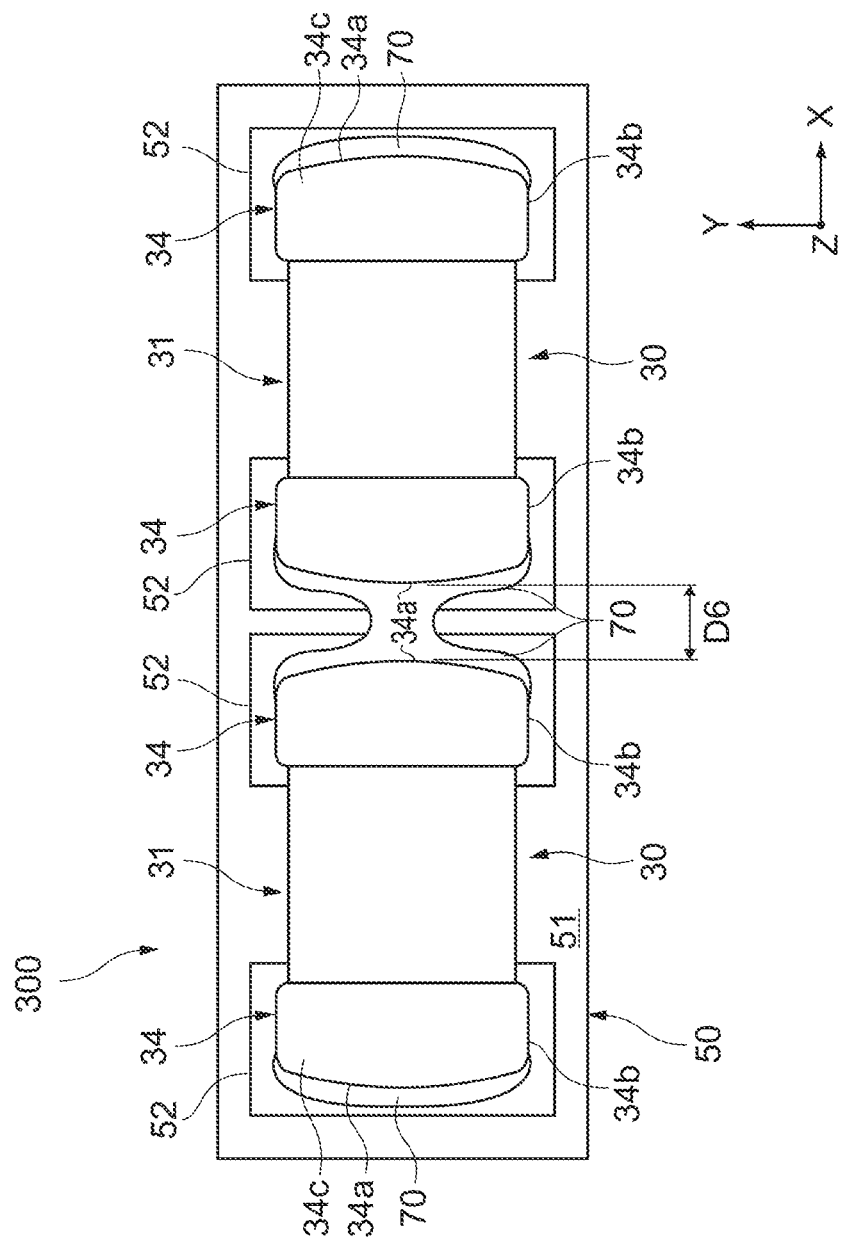
FIG. 7 is a plan view of a circuit board according to a comparative example of the embodiment.

FIG. 7 is a view of a circuit board 300 according to a comparative example of this embodiment and is a plan view of the circuit board 300 when viewed in the Z-axis direction. Note that, in the circuit board 300, the constituent elements similar to those of the circuit board 100 described above will be denoted by the same reference symbols, and description thereof will be omitted.

The circuit board 300 includes a mount board 50 having a mount surface 51, at least two multi-layer ceramic capacitors 30, and a solder 70. The circuit board 300 includes the mount board 50 similar to that of the circuit board 100, but the configuration of the multi-layer ceramic capacitor 30 is different from that in the circuit board 100.

The multi-layer ceramic capacitor 30 includes a ceramic body 31 and two external electrodes 34. Each of the external electrodes 34 has a first surface 34*a* facing in the X-axis direction, second surfaces 34*b* facing each other in the Y-axis direction, and third surfaces 34*c* facing each other in the Z-axis direction. The first surface 34*a* is configured such that the center portion thereof in the Y-axis direction has a convex shape in the X-axis direction.

In the circuit board 300, the arrangement of the lands 52 on the mount surface 51 is similar to that in the circuit board 100, and thus a distance D6 in the X-axis direction between the adjacent external electrodes 34 is substantially the same as the distance D5 in the circuit board 100. Additionally, the amount of the solder paste applied to form the solder 70 is set to be substantially the same as that applied to form the solder 60.

During the production of the circuit board 300, when the molten solder paste reaches the first surface 34*a*, the solder paste flows from peripheral portions of the first surface 34*a* that are disposed in the Y-axis direction to the center portion of the first surface 34*a* in the Y-axis direction, the center portion having a convex shape. As a result, the solder paste is easily concentrated at the center portion in the Y-axis direction. The solidified solder 70 rises thickly at the center portion in the Y-axis direction. If the distance D6 is small, e.g., 100 μm or less, as shown in FIG. 7, the solders 70 formed on the adjacent multi-layer ceramic capacitors 30 are easily fused at the center portions of the first surfaces 34*a* in the Y-axis direction. In the case where the solders 70 of different multi-layer ceramic capacitors 30 are fused, not only a defect of the appearance but also an electric defect such as a short circuit may be caused.

On the other hand, in this embodiment, the molten solder paste flows so as to cover the surfaces of the two protrusions 18. If the amount used of the solder paste is substantially the same as that of the solder 70, the amount of rise of the solder 60 per protrusion 18 is reduced. In other words, in this embodiment, the surface area of the first surface 14*a* can be increased, and the solder 60 can be prevented from being locally concentrated and from increasing the thickness thereof. Thus, even when the multi-layer ceramic capacitors 10 are mounted densely such that the distance D5 is 100 μm or less, a defect such as fusion of the adjacent solders 60 can be prevented from occurring.

Therefore, in this embodiment, it is possible to suppress a defect such as fusion of the solders 60 formed on the adjacent multi-layer ceramic capacitors 10 and to suppress a defect of the appearance and an electric defect such as a short circuit.

Such a multi-layer ceramic capacitor 10 can be produced as follows, for example.

4. Method of Producing Multi-Layer Ceramic Capacitor 10

Figure 8:
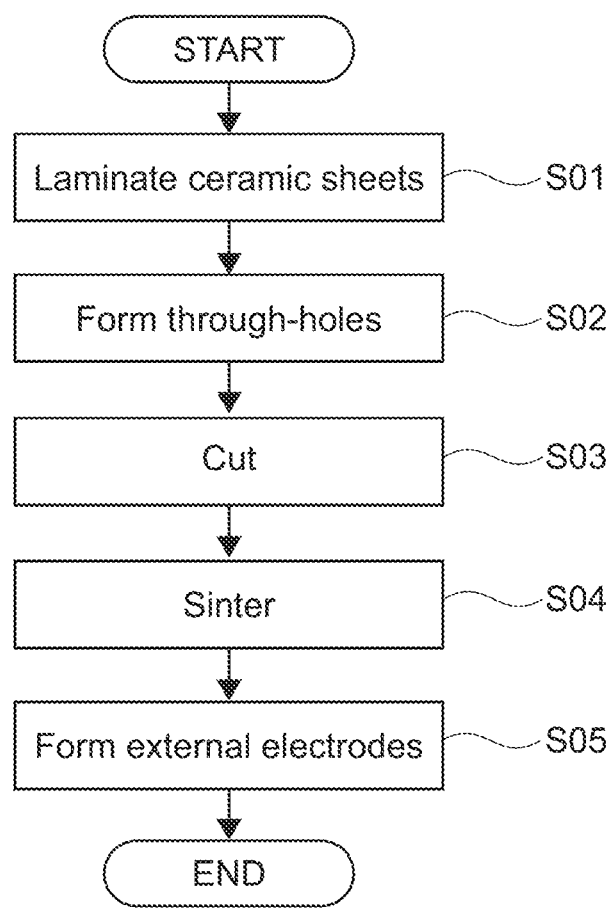
FIG. 8 is a flowchart showing a method of producing the multi-layer ceramic capacitor.

FIG. 8 is a flowchart showing a method of producing the multi-layer ceramic capacitor 10. FIGS. 9 to 12 are views showing a production process of the multi-layer ceramic capacitor 10. Hereinafter, a method of producing the multi-layer ceramic capacitor 10 will be described along FIG. 8 with reference to FIGS. 9 to 12 as appropriate.

4.1 Step S01: Lamination of Ceramic Sheets

Figure 9:
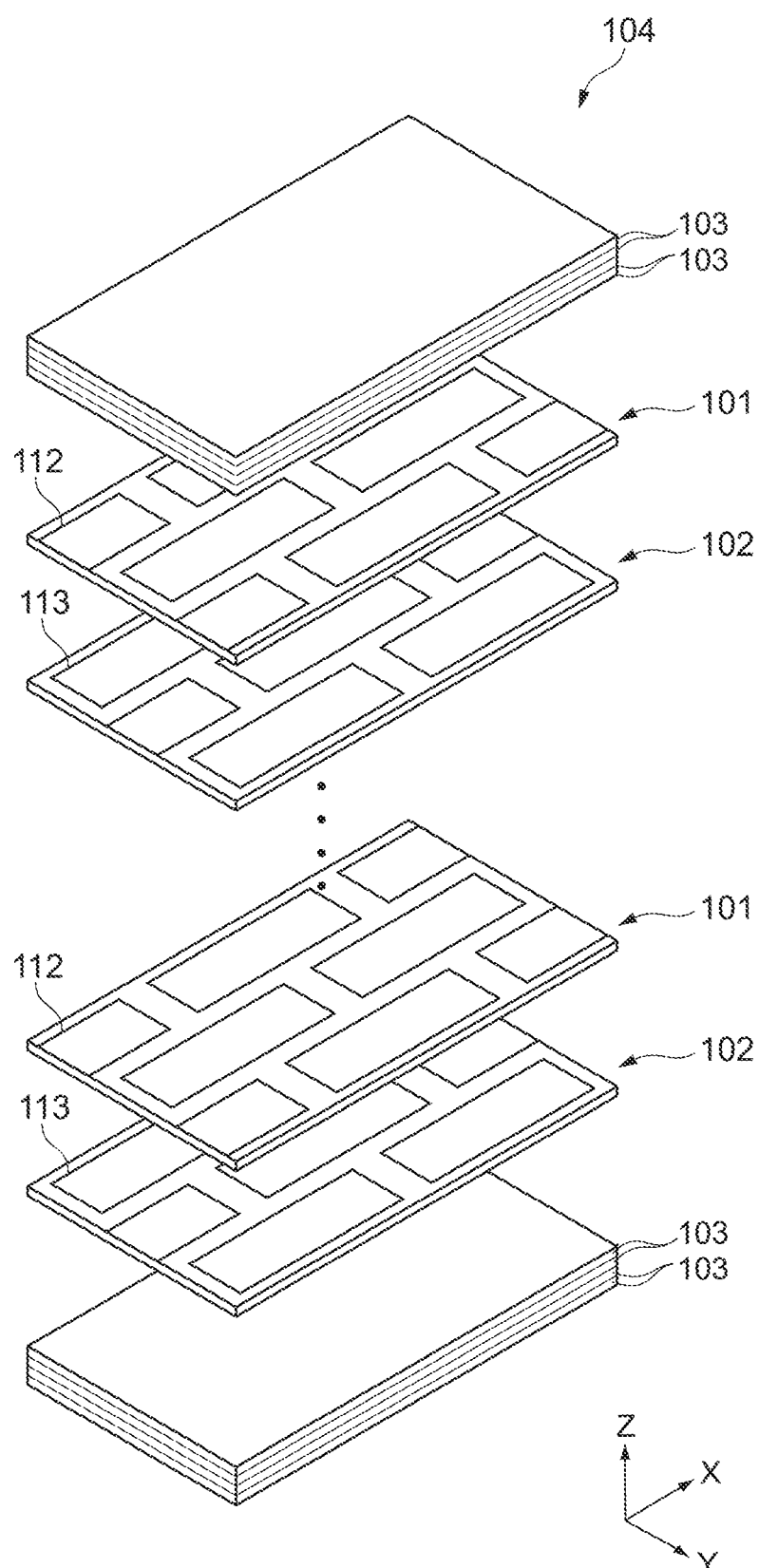
FIG. 9 is a perspective view showing a production process of the multi-layer ceramic capacitor.

In Step S01, first ceramic sheets 101, second ceramic sheets 102, and third ceramic sheets 103 are laminated as shown in FIG. 9 to form a multi-layer sheet 104.

The first, second, and third ceramic sheets 101, 102, and 103 are configured as unsintered dielectric green sheets mainly containing dielectric ceramics. Unsintered first internal electrodes 112 are formed on the first ceramic sheets 101. Unsintered second internal electrodes 113 are formed on the second ceramic sheets 102. No internal electrodes are formed on the third ceramic sheets 103.

Figure 10A:
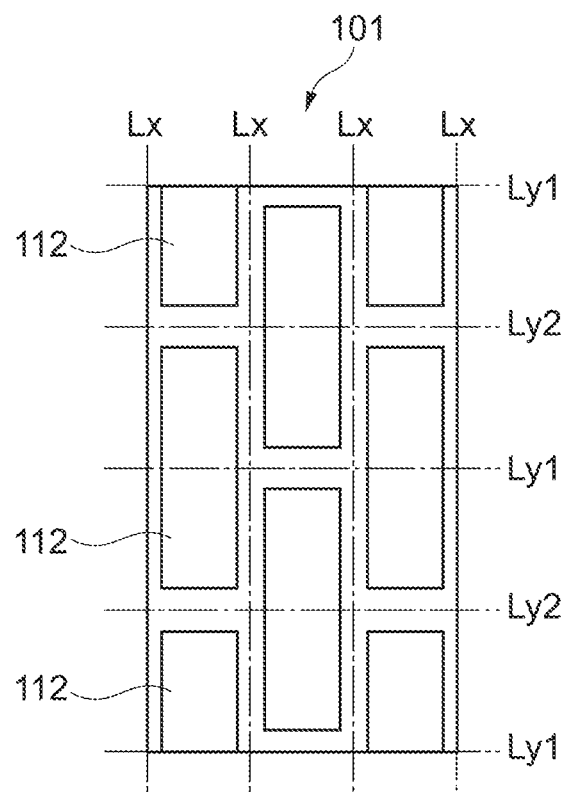
FIGS. 10A and 10B are plan views showing a production process of the multi-layer ceramic capacitor.
Figure 10B:
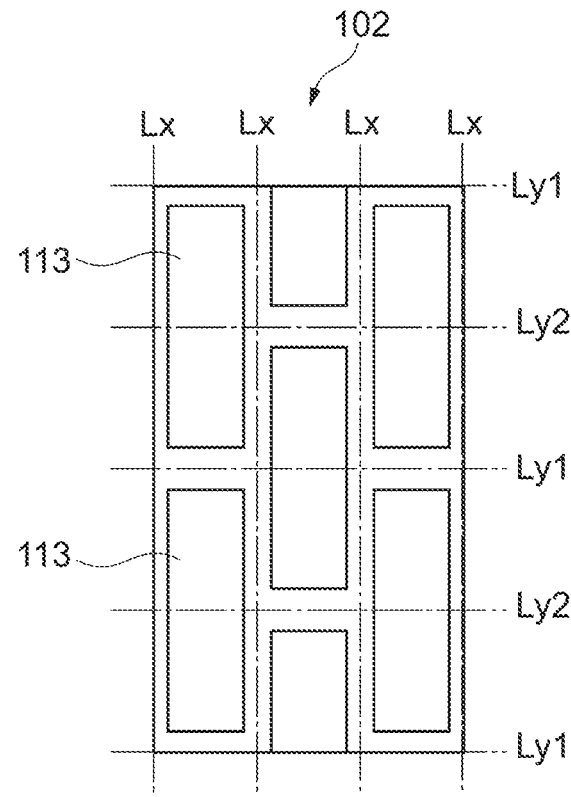

FIGS. 10A and 10B are plan views of the first and second ceramic sheets 101 and 102, respectively. At this stage, the first and second ceramic sheets 101 and 102 are each configured as a large-sized sheet that is not singulated. FIGS. 10A and 10B each show cutting lines Lx, Ly1, and Ly2 to be used when the sheets are singulated into the multi-layer ceramic capacitors 10. The cutting lines Lx are parallel to the X axis, and the cutting lines Ly1 and Ly2 are parallel to the Y axis.

The first and second internal electrodes 112 and 113 can be formed by applying an optional electrically conductive paste to the first ceramic sheets 101 and the second ceramic sheets 102, respectively. The method of applying the electrically conductive paste is optionally selectable from publicly known techniques. For example, for the application of the electrically conductive paste, a screen printing method or a gravure printing method can be used.

Each of the first and second internal electrodes 112 and 113 on the first and second ceramic sheets 101 and 102 is formed in a substantially rectangular shape that crosses one cutting line Ly1 or Ly2 and extends in the X-axis direction. The first and second ceramic sheets 101 and 102 are cut along the cutting lines Ly1, Ly2, and Lx, so that the first and second internal electrodes 112 and 113 form the first and second internal electrodes 12 and 13 of each multi-layer ceramic capacitor 10. The cutting lines Ly1 and Ly2 correspond to the end surfaces 11a of each multi-layer ceramic capacitor 10. The cutting lines Lx correspond to the side surfaces 11b of each multi-layer ceramic capacitor 10.

In the first ceramic sheet 101, a first row including the first internal electrodes 112 that extend across the cutting lines Ly1 and are disposed along the X-axis direction, and a second row including the first internal electrodes 112 that extend across the cutting lines Ly2 and are disposed along the X-axis direction are arranged alternately in the Y-axis direction. In the first row, the first internal electrodes 112 adjacent to each other in the X-axis direction face each other while sandwiching the cutting line Ly2 therebetween. In the second row, the first internal electrodes 112 adjacent to each other in the X-axis direction face each other while sandwiching the cutting line Ly1 therebetween. In other words, the first internal electrodes 112 are displaced by one chip in the X-axis direction between the first row and the second row adjacent to each other in the Y-axis direction.

The second internal electrodes 113 on the second ceramic sheet 102 are also configured to be similar to the first internal electrodes 112. However, in the second ceramic sheet 102, the second internal electrodes 113 in a row corresponding to the first row of the first ceramic sheet 101 extend across the cutting lines Ly2, and the second internal electrodes 113 in a row corresponding to the second row of the first ceramic sheet 101 extend across the cutting lines Ly1. In other words, the second internal electrodes 113 are displaced from the first internal electrodes 112 by one chip in the X-axis direction or the Y-axis direction.

As shown in FIG. 9, the first ceramic sheets 101 and the second ceramic sheets 102 are alternately laminated in the Z-axis direction. The laminate of the first and second ceramic sheets 101 and 102 corresponds to an unsintered capacitance forming unit 16. The third ceramic sheets 103 are laminated on the upper and lower surfaces in the Z-axis direction of the laminate of the first and second ceramic sheets 101 and 102. The laminate of the third ceramic sheets 103 corresponds to a cover region of an unsintered protective portion 17.

The first, second, and third ceramic sheets 101, 102, and 103 thus laminated are integrated by pressure-bonding. Thus, a large-sized multi-layer sheet 104 is produced.

4.2 Step S02: Formation of Through-Holes H

In Step S02, through-holes H are formed on the cutting lines Ly1 and Ly2 to pass through the multi-layer sheet 104 in the Z-axis direction.

Figure 11:
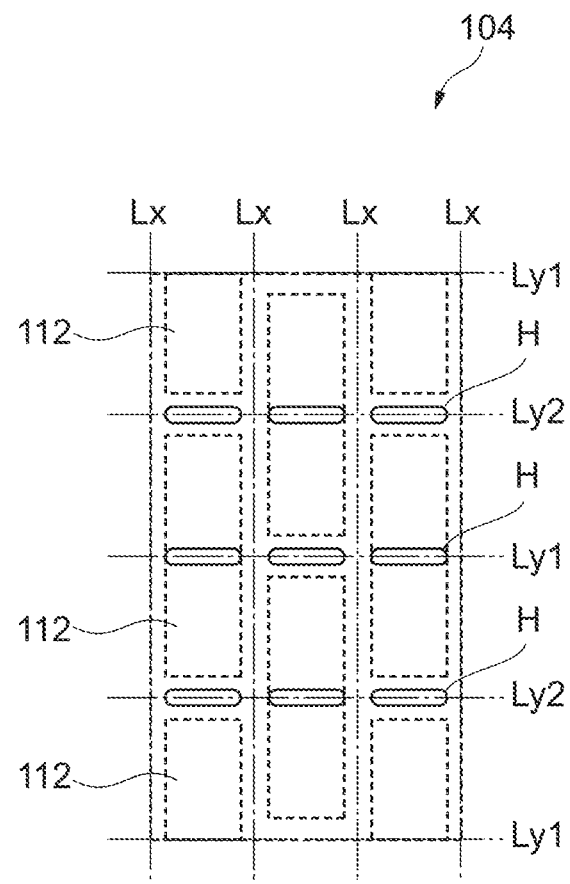
FIG. 11 is a plan view showing a production process of the multi-layer ceramic capacitor.

FIG. 11 is a plan view of the multi-layer sheet 104 when viewed in the Z-axis direction. As shown in FIG. 11, the through-holes H are formed to extend on the cutting lines Ly1 and Ly2 of the multi-layer sheet 104 and to avoid crossing the cutting lines Lx. In other words, each of the through-holes H is formed at the center portion in the Y-axis direction of a region corresponding to the end surface 11a of the multi-layer ceramic capacitor 10 in the multi-layer sheet 104.

The through-hole H is formed by, for example, cutting machining using a drill or the like. Alternatively, the through-hole H may be formed by laser machining. Additionally, the shape of the through-hole H is not limited to the elliptical shape shown in FIG. 11 and is adjusted in appropriate in accordance with the shape of a protrusion 111d of an end surface 111a to be described later, or the like.

4.3 Step S03: Cutting

In Step S03, the multi-layer sheet 104 obtained in Step S02 is cut along the cutting lines Lx, Ly1, and Ly2, to produce an unsintered ceramic body 111.

Figure 12:
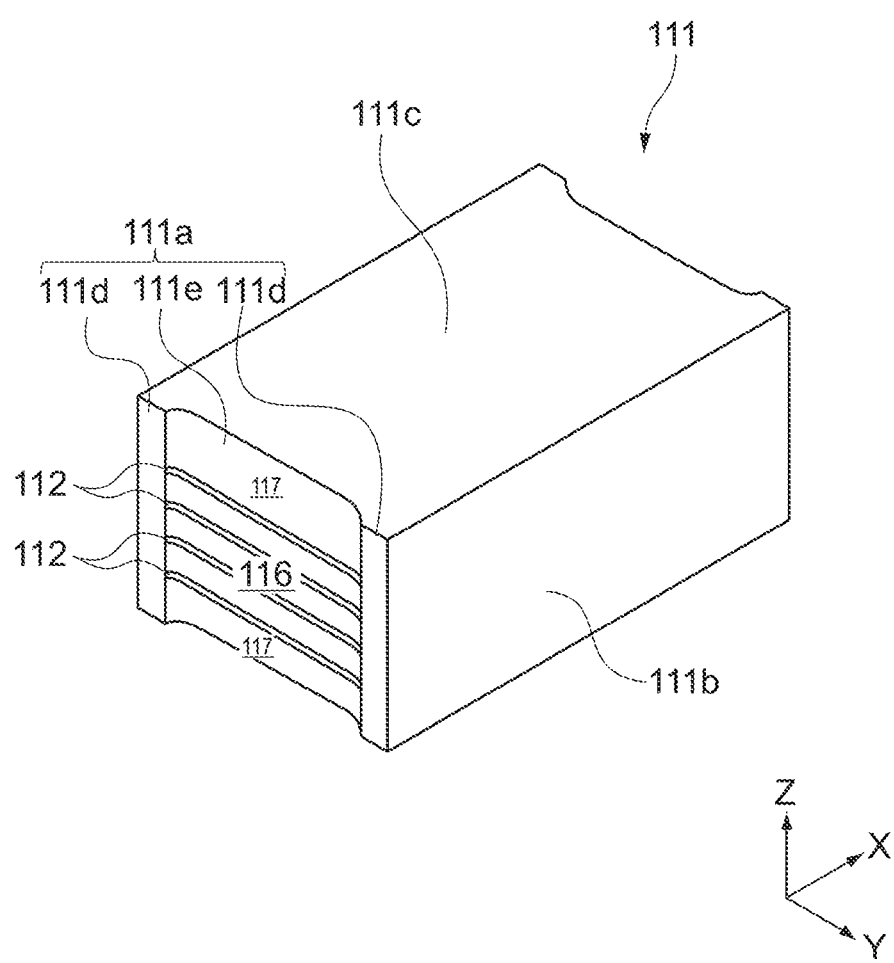
FIG. 12 is a plan view showing a production process of the multi-layer ceramic capacitor.

FIG. 12 is a perspective view of the ceramic body 111 obtained in Step S03.

As shown in FIG. 12, the unsintered ceramic body 111 has two end surfaces 111a facing each other in the X-axis direction, two side surfaces 111b facing each other in the Y-axis direction, and two main surfaces 111c facing each other in the Z-axis direction. Additionally, the unsintered ceramic body 111 includes an unsintered capacitance forming unit 116 including the unsintered first and second internal electrodes 112 and 113 alternately laminated in the Z-axis direction, and an unsintered protective portion 117 surrounding the capacitance forming unit 116.

In this embodiment, the end surface 111a includes a recess 111e and two protrusions 111d. The recess 111e is formed at the center portion of the end surface 111a in the Y-axis direction. The two protrusions 111d are disposed outside the recess 111e in the Y-axis direction and protrude in the X-axis direction. In this embodiment, the recess 111e is a concave portion formed by the through-hole H. In this embodiment, the protrusion 111d is a portion corresponding to a region on the cutting line Ly1 or Ly2, where the through-hole H is not formed, and protruding in the X-axis direction from the recess 111e.

The most protruding top portion of the protrusion 111d is not limited to the substantially flat configuration as shown in FIG. 12 and may be a convexly curved surface or may sharply protrude. Additionally, each dimension of the protrusion 111d can be set as appropriate in accordance with the dimension of the protrusion 18 of the external electrode 14.

4.4 Step S04: Sintering

In Step S04, the unsintered ceramic body 111 obtained in Step S03 is sintered, to produce the ceramic body 11 shown in FIGS. 1 to 4. Sintering can be performed in a reduction atmosphere or a low-oxygen partial pressure atmosphere, for example. Note that the ceramic body 11 obtained after sintering may be chamfered by barrel polishing or the like. Thus, the protrusion of the end surface 11a obtained after sintering also has a rounded shape.

4.5 Step S05: Formation of External Electrodes 14

In Step S05, the external electrodes 14 are formed on the ceramic body 11 obtained in Step S04, thus producing the multi-layer ceramic capacitor 10 shown in FIGS. 1 to 4.

In Step S05, first, an electrically conductive paste is applied so as to cover one of the end surfaces 11a of the ceramic body 11, and then applied so as to cover the other end surface 11a of the ceramic body 11. The electrically conductive paste applied to the ceramic body 11 is subjected to baking in a reduction atmosphere or a low-oxygen partial pressure atmosphere, for example, to form base films on the ceramic body 11. Subsequently, plating films are formed by plating such as electrolytic plating on the base films baked onto the ceramic body 11, and thus the external electrodes 14 are completed.

The electrically conductive paste used for forming the external electrodes 14 is applied to follow the shape of the end surface 11a including the protrusions. Thus, the base film obtained by baking the electrically conductive paste also has a shape including the protrusions formed along the two peripheral portions of the end surface 11a that are disposed in the Y-axis direction. Additionally, the plating film formed on the base film also has a shape including the protrusions following the shape of the base film. In other words, the two protrusions 18 of the external electrode 14 are formed on the two protrusions of the end surface 11a.

Note that part of the processing in Step S05 described above may be performed before Step S04. For example, before Step S04, an unsintered electrode material may be applied to both the end surfaces 111a of the unsintered ceramic body 111, and in Step S04, the unsintered ceramic body 111 may be sintered and, simultaneously, the unsintered electrode material may be baked to form the base films of the external electrodes 14. Alternatively, the unsintered electrode material may be applied to the ceramic body 111 that has been subjected to debinding, to simultaneously sinter the unsintered electrode material and the ceramic body 111.

5. Other Embodiments

For example, the external electrode 14 is not limited to the shape including the two protrusions 18.

Figure 13:
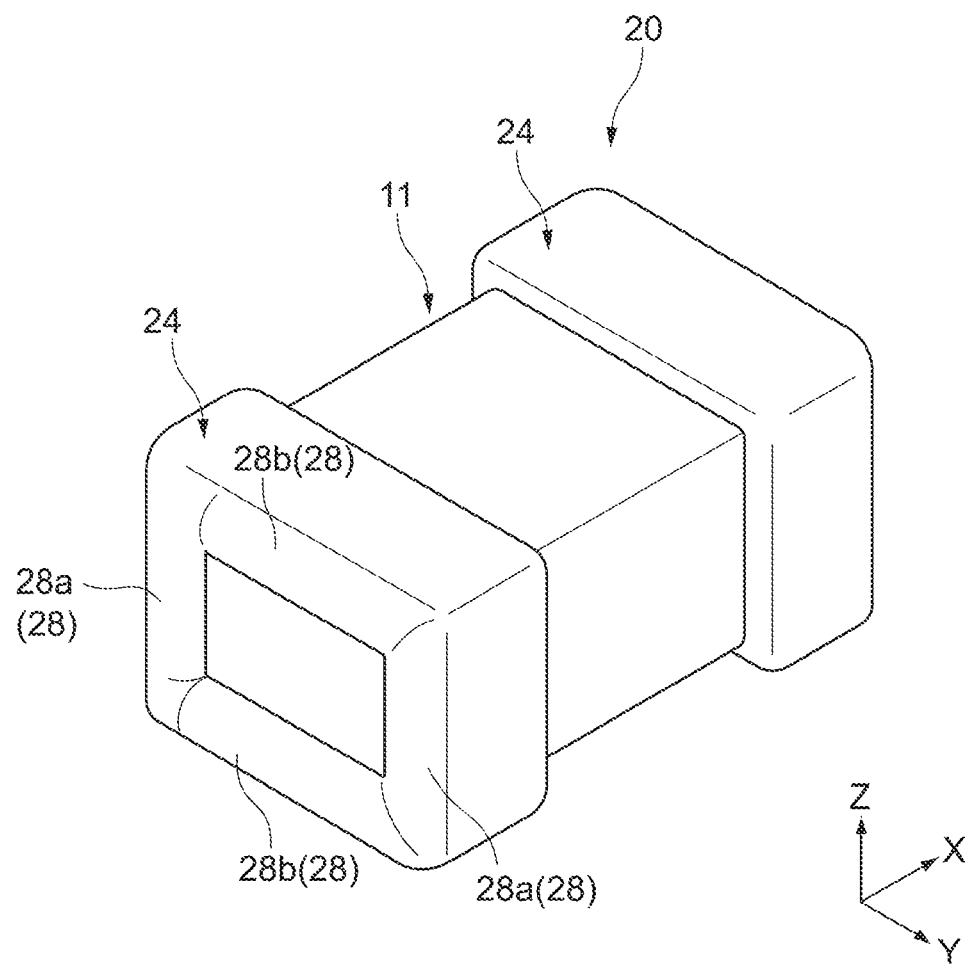
FIG. 13 is a perspective view of a multi-layer ceramic capacitor according to another embodiment of the present disclosure.

FIG. 13 is a perspective view of a multi-layer ceramic capacitor 20 according to another embodiment of the present disclosure. Note that the constituent elements of the multi-layer ceramic capacitor 20 that are similar to those of the first embodiment will be denoted by the same reference symbols, and description thereof will be omitted.

The multi-layer ceramic capacitor 20 includes a ceramic body 11 and external electrodes 24. The configuration of the external electrode 24 is different from that of the external electrode 14 of the above embodiment.

The external electrode 24 includes a protrusion 28 formed along the peripheral portion of the end surface 11a and protruding in the X-axis direction. Specifically, the protrusion 28 includes first protrusions 28a and second protrusions 28b. The first protrusions 28a are formed along two peripheral portions of the end surface 11a that are disposed in the Y-axis direction. The second protrusions 28b are formed along two peripheral portions of the end surface 11a that are disposed in the Z-axis direction. The protrusion 28 is formed in an annular shape by connecting those first protrusions 28a and second protrusions 28b.

As compared to the external electrode 34 of the multi-layer ceramic capacitor 30 shown in FIG. 7, the external electrode 24 has a large surface area by the annular protrusion 28. This makes it possible to increase an area of the solder paste spread out and to suppress the thickness of the solder at the time of mounting on a mount board. Therefore, even when the multi-layer ceramic capacitors 20 are mounted densely on the mount board, a defect such as fusion of adjacent solders can be prevented from occurring.

While the embodiments of the present disclosure have been described, the present disclosure is not limited to the embodiments described above, and it should be appreciated that the present disclosure may be variously modified without departing from the gist of the present disclosure.

For example, the method of producing the multi-layer ceramic capacitor 10 is not limited to the above method. The external electrodes 14 shown in FIGS. 1 to 4 can also be formed by, for example, forming a ceramic body 11 having a substantially rectangular parallelepiped shape without protrusions 111d, and subsequently applying an electrically conductive paste to peripheral portions of each end surface 11a that are disposed in the Y-axis direction and then to the entire end surface 11a. Alternatively, the external electrodes 14 shown in FIGS. 1 to 4 can also be formed by forming a ceramic body 11 having a substantially rectangular parallelepiped shape without protrusions 111d, and subsequently applying an electrically conductive paste to the entire end surface 11a and then to peripheral portions of the end surface 11a that are disposed in the Y-axis direction.

Additionally, in the embodiments described above, the multi-layer ceramic capacitors 10 and 20 have been described as examples of a multi-layer ceramic electronic component, but the present disclosure can be applied to any other multi-layer ceramic electronic components each including a pair of external electrodes. Examples of such multi-layer ceramic electronic components include a chip varistor, a chip thermistor, and a multi-layer inductor.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A multi-layer ceramic electronic component, comprising:
   a ceramic body including
   an end surface facing in a first direction, and
   internal electrodes exposed from the end surface and laminated in a second direction orthogonal to the first direction,
   wherein the end surface has two first peripheral portions being disposed opposite each other in a third direction orthogonal to the first direction and the second direction, and two second peripheral portions being disposed opposite each other in the second direction; and
   an external electrode provided on the end surface and including two protrusions that are formed continuously along the two first peripheral portions of the end surface, respectively, and protrude in the first direction,
   wherein the external electrode includes no protrusions protruding in the first direction and extending continuously along the two second peripheral portions of the end surface,
   and wherein a dimension of each of the two protrusions in the third direction is 15 μm or more and 60 μm or less.

2. The multi-layer ceramic electronic component according to claim 1, wherein
a dimension of each of the two protrusions in the first direction is 10 μm or more and 20 μm or less.

3. The multi-layer ceramic electronic component according to claim 1, wherein
each of the two protrusions includes a top portion most protruding in the first direction on a cross-section viewed in the second direction, and
a distance in the third direction between the top portions of the two protrusions is 250 μm or more and 285 μm or less.

4. A circuit board, comprising:
a mount board having a mount surface;
two multi-layer ceramic electronic components disposed side by side in a first direction and each including
a ceramic body including
an end surface facing in the first direction, and
internal electrodes exposed from the end surface and laminated in a second direction orthogonal to the first direction,
wherein the end surface has two first peripheral portions being disposed opposite each other in a third direction orthogonal to the first direction and the second direction, and two second peripheral portions being disposed opposite each other in the second direction, and
an external electrode provided on the end surface and connected to the mount surface; and
a solder that bonds a surface of the external electrode and the mount surface to each other,
wherein the external electrode includes two protrusions that are formed continuously along the two first peripheral portions of the end surface, respectively, and protrude in the first direction,
the external electrode includes no protrusions protruding in the first direction and extending continuously along the two second peripheral portions of the end surface,
a distance in the first direction between the external electrodes of the two multi-layer ceramic electronic components is 100 μm or less, and
a dimension of each of the two protrusions in the third direction is 15 μm or more and 60 μm or less.

5. The circuit board according to claim 4, wherein the mount surface includes a land, and
the solder bonds the surface of the external electrode and the land to each other.

6. A multi-layer ceramic electronic component, comprising: a ceramic body including
an end surface facing in a first direction, and
internal electrodes exposed from the end surface and laminated in a second direction orthogonal to the first direction; and
an external electrode provided on the end surface and including two protrusions that are formed continuously along two peripheral portions of the end surface, respectively, and protrude in the first direction, the two peripheral portions being disposed opposite each other in a third direction orthogonal to the first direction and the second direction,
wherein a width of each of the two protrusions in the third direction is less than a distance between the two protrusions in the third direction.

7. The multi-layer ceramic electronic component according to claim 6, wherein the width of each of the two protrusions in the third direction is 15 μm or more and 60 μm or less.

8. The multi-layer ceramic electronic component according to claim 6, wherein a dimension of each of the two protrusions in the first direction is 10 μm or more and 20 μm or less.

9. The multi-layer ceramic electronic component according to claim 6, wherein
the two protrusions have apexes, respectively, protruding most in the first direction, and
a distance between the apexes of the two protrusions is 250 μm or more and 285 μm or less.

* * * * *